May 24, 1966  A. F. FEYLING  3,253,280
INCLINOMETER
Filed Feb. 5, 1964
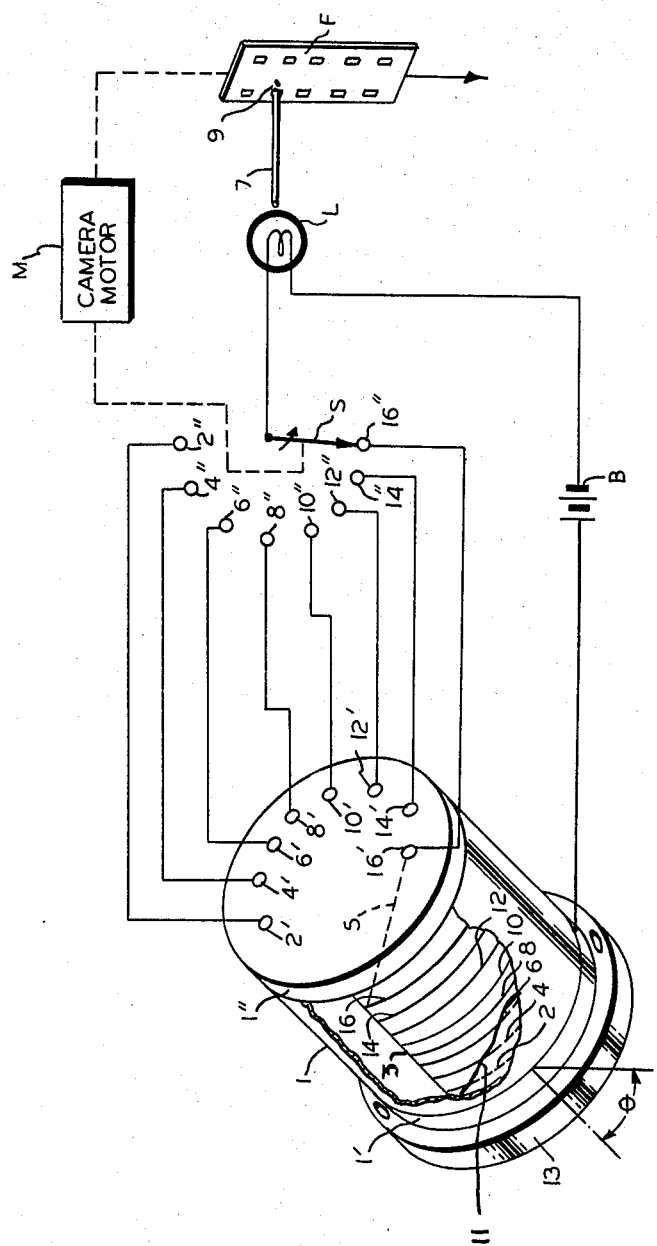
INVENTOR
A. FRED FEYLING
BY Rines and Rines
ATTORNEYS

United States Patent Office 3,253,280
Patented May 24, 1966

3,253,280
INCLINOMETER
Anders Fred Feyling, 221 Mount Auburn St.,
Cambridge, Mass.
Filed Feb. 5, 1964, Ser. No. 342,733
9 Claims. (Cl. 346—108)

The present invention relates to inclinometers and, more particularly, to apparatus for electrically and/or optically indicating the degree of angular orientation of an object, hereinafter generically referred to as "inclination."

Numerous devices have heretofore been proposed for indicating the inclination of objects, such as measuring or sensing equipment at remote areas or the like, embodying techniques ranging from optical and electrical sensing to the photographing of liquid-level bubbles, pivotal pointers or other indicators. There are applications, however, as, for example, in underwater current sensing or measurements in other remote locations, where it is desired to provide a readily digitally convertible indication of the inclination of the sensor, preferably upon a recording medium, such as a photographic film, that will enable correction or compensation to be effected for measurements at changing angles of inclination.

An object of the present invention, accordingly, is to provide a novel digitally convertible indication-producing inclination-measuring apparatus of such character that is particularly, though not exclusively, useful with underwater sensing equipment.

A further object is to provide a novel inclination-measuring-and-indicating apparatus of more general utility, also.

Other and further objects will be explained hereinafter and will be more particularly pointed out in connection with the appended claims. In summary, however, from one of its broadest aspects, the invention embodies a conductive liquid adapted to contact different numbers of successive electrical contact elements disposed along an inclinable member, the number depending upon the degree of inclination of the member; with an indicating circuit, preferably, though not essentially, embodying an illuminable lamp for exposing a photographic recording medium, for providing an indication of the said number of contact elements contracted by the liquid medium, thereby to indicate the said degree of inclination.

The invention will now be described in connection with the accompanying drawing the single figure of which is a combined isometric view and schematic circuit diagram of a preferred embodiment.

Referring to the drawing, an inclinometer constructed in accordance with the invention is shown comprising an outer cylindrical housing 1 having a conductive base 1', a cover 1″ and a coaxially disposed inner insulating cylindrical member 3. Wound upon the member 3, at successive spaced intervals therealong, is a plurality of separate conductive-ring contact elements 2, 4, 6, 8, 10, 12, 14, 16, etc., each connected by conductors to corresponding separate binding posts 2′, 4′, 6′, 8′, 10′, 12′, 14′, 16′, etc. on the cover 1″ (as illustrated, for example, by the conductor 5 connecting ring contact element 16 to binding post 16′). Each binding posts 2′–16′, in turn, is connected by a conductor to corresponding terminals 2″–16″, arranged to be successively engaged by a rotatable switching contactor S.

An indicating circuit comprising an illuminable lamp L and an energy source therefor, such as a battery B, is connected between the switching contactor S and the base 1′ of the housing 1. The illumination from the lamp L is directed preferably by an optical fiber or fibers 7 to a predetermined region 9 across which a recording medium, such as a moving picture photographic film F, is moved in the direction of the arrow in conventional fashion, as by a camera motor M.

When the housing 1 and its internal member 3 is inclined to the vertical, for example, at the indicated angle θ, a conductive liquid medium 11, such as mercury disposed upon the conductive base 1′ between the outer housing 1 and the internal member 3, will contact one or more of the ring contact elements 2–16. At an angle θ=5°, as an illustration, the conductive liquid medium 11 will provide connection between the base 1′ and the first ring element 2; at 10°, the medium 11 will contact the two ring elements 2 and 4; and so on, with the medium 11 contacting all ring elements 2 through 16 when the housing is inclined at θ=40°. Thus, as the switch S is operated successively to contact terminals 2″–16″, the lamp L will be illuminated by the closed circuit connections provided only by those ring elements 2–16 that are contacted by the liquid medium 11, corresponding to the particular angle θ of inclination.

If, for example, the housing 1 is attached, as by a flange plate 13 to an underwater current meter (not shown) sensing data and exposing the film F to digital indications thereof, the region 9 of the film will have impressed upon it successive flashes from the lamp L corresponding to the number of ring elements 2–16 contacted by the liquid medium 11. Thus the inclination of the current meter is digitally indicated upon the film F as a series of successive dots representative in number of the angle θ of inclination. This can thus be used to correlate or correct the other information applied to the film by the current meter or other sensing or measuring equipment with which the inclinometer is employed. Since the switch S is driven by and thus synchronously with the film-advancing motor M, the dots exposed upon the film, as the lamp L flashes, will be equally spaced and thus readily adapted for conversion to digital information. With an angle θ=10°, for example, the lamp L will flash as the switch S successively contacts the terminals 2″ and 4″, producing two equally spaced similar dots on successive portions of the film F in the region 9.

In actual apparatus employed for underwater inclination measurements, apparatus of the type above-described has successfully been used with eight rings representing 5° inclination increments up to 40°, with an incandescent lamp L, a six-volt battery B and a 16 mm. camera recorder.

While the invention has been described in connection with a cylindrical coaxial configuration, it is to be understood that other configurations may also be employed as may other contact elements than conductive rings and other recording or indicating media and circuits. Further modifications will also occur to those skilled in the art and all such are considered to fall within the spirit and scope of the invention as defined in the appended claims.

What is claimed is:
1. Inclination-measuring apparatus having, in combination, an inclinable member carrying a plurality of electrical contact elements disposed as successive positions therealong, a conductive liquid medium carried with the member and disposed to establish electrical connection with different numbers of successive contact elements depending upon the degree of inclination of the member, a plurality of electric terminals one corresponding to and connected with each contact element, switching means operable successively to engage the successive terminals of the plurality of electric terminals, a single indicating device having an energization circuit connected between the liquid medium and the switching means for energizing said indicating device when the switching means engages a terminal corresponding to a contact element electrically connected with the liquid medium, a recording medium for recording the indications of said indicating device, and means for moving said recording medium past a predetermined recording region synchronously with the operation of said switching means to produce successive indications on successive portions of the moved recording medium corresponding to indications produced by the switching means engaging successive terminals in turn corresponding to successive contact elements connected with the liquid medium.

2. Apparatus as claimed in claim 1 and in which the said inclinable member is disposed within a housing containing the conductive liquid medium.

3. Apparatus as claimed in claim 2 and in which the said electrical contact elements comprise conductive rings disposed about the said inclinable member and insulated from one another.

4. Apparatus as claimed in claim 3 and in which the base of the housing is conductive to establish one of the connections of the said circuit to the liquid medium.

5. Apparatus as claimed in claim 4 and in which each conductive ring contact element is carried to a binding post upon the cover of the housing and each electrical terminal is connected to a corresponding binding post.

6. Apparatus as claimed in claim 2 and in which the housing is provided with means for attaching the same to objects the inclination of which is to be measured.

7. Inclination-measuring apparatus having, in combination, an inclinable member carrying a plurality of electrical contact elements disposed at successive positions therealong, a conductive liquid medium carried with the member and disposed to establish electrical connection with different numbers of successive contact elements depending upon the degree of inclination of the member, a plurality of electric terminals one corresponding to and connected with each contact element, switching means operable successively to engage the successive terminals of the plurality of electric terminals, and an indicating circuit connected between the liquid medium and the switching means for providing an indication of the said number of contact elements contacted by the liquid medium thereby to indicate the said degree of inclination, the indicating circuit comprising illuminable lamp means and a source of energy therefor, with a complete closed circuit being established to illuminate the lamp means from the source when the switching means engages a terminal corresponding to an electrical contact element contacted by the liquid medium, a recording medium sensitive to illumination of said lamp means, means for moving the recording medium past a predetermined region synchronously with the operation of said switching means, and means for directing the illumination of the lamp means upon the recording medium at the said region to produce successive indications on successive portions of the moved recording medium corresponding to illuminations produced by the switching means engaging successive terminals in turn corresponding to successive electrical contact elements contacted by the liquid medium.

8. Apparatus as claimed in claim 7 and in which the said directing means comprises optical fiber means disposed between the lamp means and the recording medium.

9. Apparatus as claimed in claim 7 and in which the said recording medium is a photographic film, the medium moving means comprises a camera film-driving motor and the switching means is connected to be driven by the motor.

References Cited by the Examiner

UNITED STATES PATENTS

| 2,338,811 | 1/1944 | Hasbrook | 33—206 |
| 2,910,782 | 11/1959 | Krantz | 33—206 |
| 3,029,717 | 4/1962 | Hildebrandt. | |
| 3,137,077 | 6/1964 | Rosenthal | 33—205 |
| 3,157,854 | 11/1964 | Riley | 200—61.47 X |

FOREIGN PATENTS 354,444 8/1931 Great Britain.

LOUIS J. CAPOZI, Primary Examiner.

J. W. HARTARY, Assistant Examiner.